United States Patent
Wen

(10) Patent No.: US 12,197,893 B2
(45) Date of Patent: Jan. 14, 2025

(54) DATA DRIVEN COMPUTING SYSTEM DEVELOPMENT

(71) Applicant: Jin Ming Wen, San Jose, CA (US)

(72) Inventor: Jin Ming Wen, San Jose, CA (US)

( * ) Notice: Subject to any disclaimer, the term of this patent is extended or adjusted under 35 U.S.C. 154(b) by 227 days.

(21) Appl. No.: 18/108,649

(22) Filed: Feb. 12, 2023

(65) Prior Publication Data
US 2023/0289144 A1   Sep. 14, 2023

Related U.S. Application Data

(60) Provisional application No. 63/318,765, filed on Mar. 10, 2022.

(51) Int. Cl.
*G06F 8/20* (2018.01)
*G06F 8/10* (2018.01)

(52) U.S. Cl.
CPC . *G06F 8/20* (2013.01); *G06F 8/10* (2013.01)

(58) Field of Classification Search
CPC ..................................... G06F 8/10; G06F 8/20
See application file for complete search history.

(56) References Cited

U.S. PATENT DOCUMENTS

2009/0204952 A1 *   8/2009   Naccache ........... G06F 11/0715
                                                    717/126

* cited by examiner

*Primary Examiner* — Ziaul A Chowdhury

(57) ABSTRACT

The present invention is based on the data value and data timing attributes realizations and provides an explicitly defined definite or fixed method for constructing a computing system software consisting of (1). A definite system development method; (2). A definite safety relevant system development method in the furthermore manner; (3) the specific and definite criteria to measure the software and the safety. Said method is based on the exclusive disclosure that is: computing system functionalities can be fully represented by the data comprising Input Data, Middle Data and Output Data, in which the Output Data represent fully the system functionalities under the input data from the system blackbox point of view, the Middle Data represent fully the middle functionalities that are transporting and transforming the Input Data to the Output Data. In the system, each data has two and only two systematic attributes: data value and data timing attributes. So, the software development goal is to derive the two systematic attributes for each required output data correctly, and the safety development goal is to make sure that the two attributes of each output data are derived correctly and reliably. And such developments will be complete, consistent, accurate and efficient because all required information and development activities are covered, and any other information and other activities are not included.

3 Claims, 1 Drawing Sheet

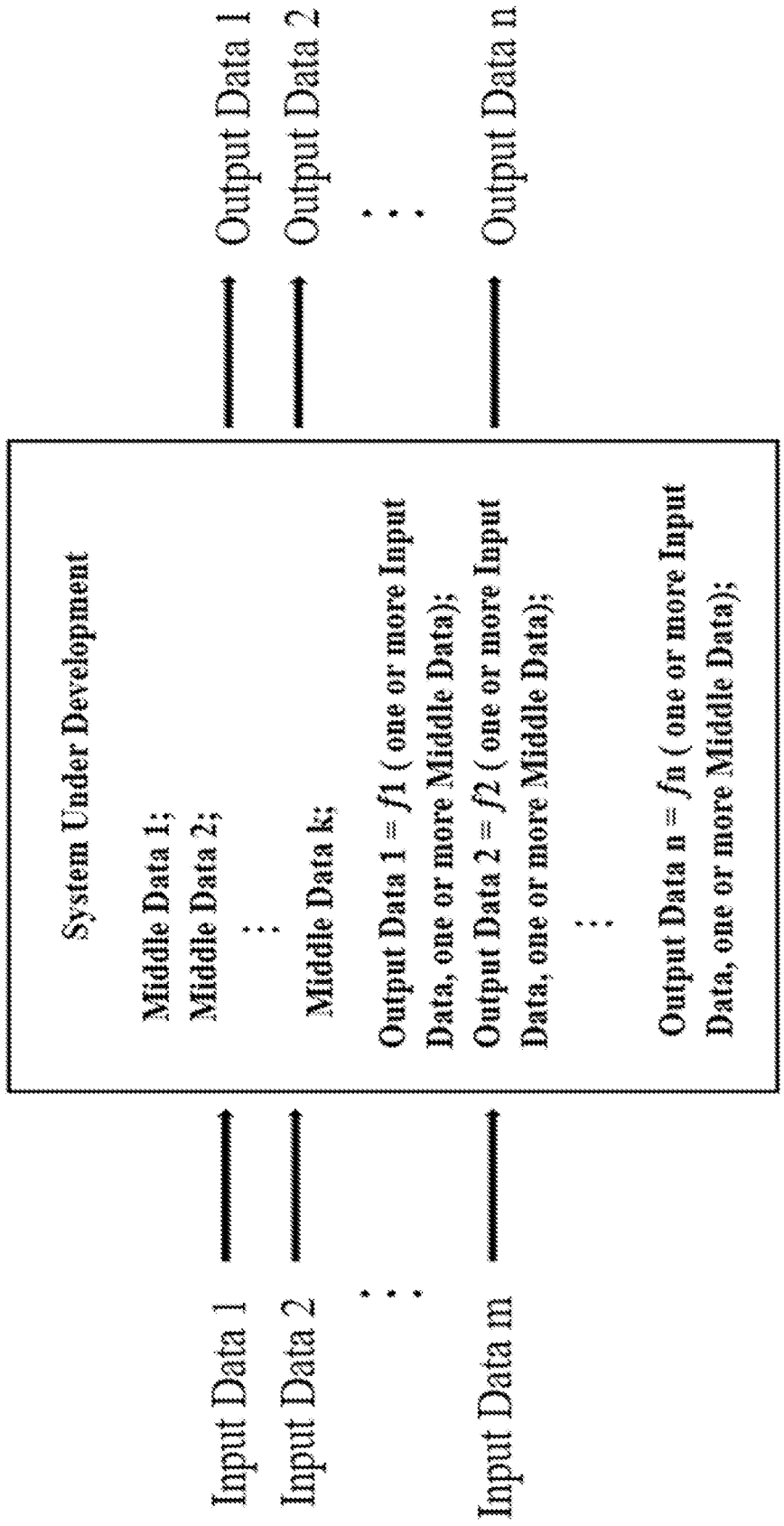

DATA DRIVEN COMPUTING SYSTEM DEVELOPMENT

The present application claims priority to the earlier filed provisional application having the U.S. Application No. 63/318,765, Filing Date: Mar. 10, 2022, Name of Inventor: Jin Ming Wen, Title of Invention: Data driven computing system development, and hereby incorporates subject matter of the provisional application in its entirety.

COPYRIGHT NOTICE

This application includes material that is subject to copyright protection. The copyright owner has no objection to the facsimile reproduction by anyone of the patent document or patent disclosure, as it appears in the Patent and Trademark Office files or records, but otherwise reserves all copyright rights whatsoever.

BACKGROUND OF THE INVENTION

Field of the Invention

The invention discloses a definite approach to construct computing system software based on the data: Input data, Middle data and Output data, and the calculations or relationships between them and provides the safety mechanism development approach to make sure that the software will work correctly by focusing on only two unique systematic attributes: Data Value and Data Timing. In this way, the software constructions, the relevant software safety mechanisms developments and the measurement criteria for both software constructions and safety developments are defined once the data and the calculations between them are defined in the system. Every computing system software has two, and only two attributes: Data Value and Data timing, which fully represent the system functionalities from the system external behavior point of view. And the system development goal is to realize those attributes for each required output data, in which, the data values are derived by the calculations for the output data, and the data timing is derived by the system latency including both data transmission durations and data calculations durations, and the safety mechanisms' goal is to detect any deviations of those two attributes in said data and prevent the system or software from impacting other systems by outputting the deviated data, so that the system development activities including the software constructions and the safety mechanisms' implementations can be optimized significantly.

Description of the Related Art

Computing System Development

Currently there is no other fixed way to construct computer software. Even for same products in same organizations, different developers have different ways to develop the required software, which is prone to mistakes and inefficient. For example, in the Software Engineering Handbook from NASA, there are 18 different suggested ways to construct software, one of which is the "4+1" views which applies total of 5 view modules, and each of the view modules has multiple ways to construct the required software based on developers' experiences. The inconsistency of such developments significantly impacts the software products' quality and developments' efficiency. The commonly used computing system development is based on the developers' experience and the development specifications are specified either using the text tools, such as IBM DOORS or PTC Integrity, or the notation tools, such as the SysML that includes 9 types of diagrams, the issues of which are that there is neither the clearly defined explicit and complete approach to design the system and specifications, nor is there the clearly defined explicit and complete method to fully cover all the system functionalities, which will cause issues in the software development.

For the text specified specifications, the issues will include that the text specifications are prone to ambiguous and incomplete, and it is difficult to figure out the logic relationships in the specifications, whose consequence is that the specifications may be inconsistent, incomplete and inaccurate, then it will cause the issues in the following development steps. For example, the system requirements that describe the users' needs for the products under development are commonly documented using IBM DOORS in text format combining with some diagrams, which will be easily interpreted into different meanings by different person, and it will be very difficult to fully and accurately describe the users' needs.

For the notation specified specifications, the issues include that it is difficult to fully specify the system functionalities, and it is difficult to use the notations in the entire development team, and it is difficult to figure out the relationships in all the diagrams used in the development.

Safety Development in a Computing System

There is the same issue in software safety development in a computing system as the one above: currently there is not fixed way to development the safety mechanisms for a specific computer software, even for same software products in same organizations, different developers have different ways to develop the safety mechanisms, there are not unique criteria to measure software safety. Safety development in a computing system is guided by the IEC 61508, and the safety development in an automotive electronic control unit (ECU) system is guided by the ISO 26262. In both standards, although there are some quantitative hardware criteria about the safety, such as the Single Point Fault Metric (SPFM), Latent Fault Metric (LFM) and the Probabilistic Metrics for Hardware Failures (PMHF) listed in the Table 3.4 14 Hardware Fault Metrics in the Part 5 of ISO 26262, however, the criteria to measure if a software component or the whole system is safe are not specified, and the safety development measures mentioned in both of them are very vague because only very high-level activities are specified, for example, in the ISO 26262 Part 4: Product development at the system level and the ISO 2626 Pat 6: Product development at the software level, but those activities are highly dependable to interpretation and implementation, which is very difficult to make accurate adjudgment.

The commonly used safety development approaches in computing systems such as an automotive electronic control unit (ECU) system are based on the developers' experience, and based on the requirements and design specifications that are specified either using the text tools, such as IBM DOORS or MKS Integrity, or the notation tools, such as the SysML that includes 9 types of diagrams, the issues of which are that there is neither the clearly defined explicit and complete approach to design the safety mechanisms, nor is there the clearly defined explicit and complete method to fully cover all the safety aspects in the system.

For the text specified specifications, the issues will include that the text specifications are prone to ambiguous and incomplete, and it is difficult to figure out the logic relationships in the specifications, whose consequence is that the safety mechanisms may be inconsistent, incomplete and inaccurate, and the safety development is inefficient.

For the notation specified specifications, the issues include that it is difficult to fully specify the system safety, and it is difficult to use the notations in the entire development team, and it is inefficient to develop the safety mechanisms based on all the diagrams used in the development.

BRIEF SUMMARY OF THE INVENTION

The present invention provides a definite or fixed method for implementing a computing system software and safety mechanisms, and provides the clearly defined and specific unique criteria to measure both software constructions and the safety mechanisms for said software based on the data value and data timing attributes, said method is based on the exclusive disclosure: every computing system has two and only two systematic attributes: data value and data timing, and the system functionalities can be fully represented by the data comprising Input Data, Middle Data and Output Data illustrated in the drawing, in which the Output Data represent fully the system functionalities under the input data from the system black-box point of view, the Middle Data represent fully the middle functionalities that are transporting and transforming the Input Data to the Output Data. Each data has two, and only two attributes: Data Value and Data Timing, and the goals of system development are to derive the two attributes for each required output data correctly; and the purpose of said safety mechanisms of said system software is to detect every deviation of either said two attributes of said data between implemented ones and defined ones (that are defined as errors) that will impact said attributes of any said output data, and prevent said system software from impacting other systems caused by outputting deviated data from said software.

So, the development activities regarding to the system functionalities and safety, such as the value and data timing attributes realizations and systematic safety developments, will be complete, consistent, accurate and efficient if they are applied on the data and their relationships defined in said system.

BRIEF DESCRIPTION OF THE DRAWING

The drawing is an illustration of some embodiments of the disclosure. The preceding and other objects, features, and advantages of the disclosure will be apparent from the following description of embodiments.

DETAILED DESCRIPTION OF THE INVENTION

The invention discloses a specific and definite method to construct computing software based on said system requirements by focusing on only two attributes: Data Value and Data Timing, wherein said method consisting of:
 a. defining and implementing a plurality of data based on said system's requirements, wherein each said data consists of only two systematic attributes consisting of data value attribute and data timing attribute, consisting only of 3 types of data:
  1). one or more input data which are imported from input devices of said system; and
  2). one or more middle data which are stored in memory devices of said system; and
  3). one or more output data which are exported by output devices of said system; and
 b. defining and implementing data calculations for each said output data using one or more said middle data and one or more said input data in said system, wherein each said calculation consists of:
  1). one or more mathematic expressions; or
  2). one or more logic expressions; or
  3). one or more experience expressions; or
  4). one or more artificial intelligence expressions; or
  5). derivations of one or more expressions above; and
 c. executing said implemented calculations to derive both said systematic attributes for each said output data which are development goals of said software; and
 d. developing safety mechanisms for each said output data to prevent said software from outputting deviated data if either attribute of said data deviates from their definitions;
 wherein said computer system consisting of:
 a. one or more input devices for inputting said input data into said computer system from outside using input transmission protocol; and
 b. one or more output devices for outputting said output data out of said computer system from inside using output transmission protocol; and
 c. one or more memory devices for storing said middle data that are generated during said calculations; and
 d. one or more Arithmetic Logic Unit devices for doing said calculations; and
 e. one or more data transmission links between said devices; and
 f. a management system for managing said devices and said links.

Computing System Operation Concept

For every computing system, it can be described using elements illustrated in the drawing consisting of a plurality of output data, a plurality of input data, a plurality of middle data and the calculations that are represented by formulas of f1, ..., fn, among which, one calculation is defined to derive each output data using one or more input data and one or more middle data. Wherein said calculations consist of not only the mathematic calculation but also any methods to derive the output data, such as logic expression, a fuzz expression, an experience or AI expression, or any combinations and derivations of those mentioned expressions. The description above illustrated in the drawing is the system operation concept, wherein said data and said calculations are mandatory in every computing system development because they establish the relationships between the output data and input data via the middle data, and they must be defined at the beginning of the development. If any said data or any said calculations is not defined accurately, explicitly and completely, then the system development or the required software constructions will be infeasible. And the following development steps including the software constructions and safety mechanisms' developments will be done based on those defined data and relationships, so, (1) the development is consistent, (2) the development will cover fully the required information, (3) the development will not include any other information or steps that are not defined above.

Each data in a computing system has two, and only two attributes: Data Value and Data Timing, and the goals of system development are to derive the two attributes for each defined output data.

For one of embodiments in the drawing, the system operation concept based on the output data, the input data and the middle data can be defined in detail using formulas below:

Output Data 1=f1 (Input Data 1l, ..., Input Data 1i, Middle Data 1l, ..., Middle 1j);
Output Data 2=f2 (Input Data 2l, ..., Input Data 2l, Middle Data 2l, ..., Middle 2p);
...
Output Data n=fn (Input Data nl, ..., Input Data nq, Middle Data 1n, ..., Middle nr).

Among the formulas above, m, n, k, i, j, l, p, q, r all are integers with the relationships: 1<=i, l, q<=m; 1<j, p, r<=k; and all the input data groups consisting of the group of Input Data 1l, ..., Input Data 1i, and the group of Input Data 2l, ..., Input Data 2l, ..., and the group of Input Data nl, ..., Input Data nq are subsets of the input data group consisting of Input Data 1, ... Input Data m; and all the middle data groups consisting of the group of Middle Data 1l, ..., Middle Data 1j, and the group of Middle Data 2l, ..., Middle Data 2p, ..., and the group of Middle Data nl, ..., Middle Data nr are subsets of the middle data group consisting of Middle Data 1, ... Middle Data k.

Wherein said Output Data 1 is derived from all the operated data in the calculation represented by the formula of f1 consisting of Input Data 1l, ..., Input Data 1i, Middle Data 1l, ..., Middle 1j; and using the same way to derive the Output Data 2, ..., Output Data n.

The derivation method above can be done recursively to every data in the system concept that need to be decomposed further into decompositions as the development progresses. For example, if the Middle Data 1l needs to be decomposed into such expression: Middle Data 1l=fm1l (Input Data 1l1, ... Input Data 1l1i, Middle Data 1l1l, ..., Middle Data 1l1j), wherein said fm1l is the calculation to derive the Middle data 1l, said input data group of Input Data 1l1, ..., Input Data 1l1i is a subset of input data group of Input Data 1l, ..., Input Data 1i, said middle data group of Middle Data 1l1, ..., Middle Data 1l1j is a subset of middle data group of Middle Data 1l, ..., Middle Data 1j. Then the derivation method for the Middle Data 1l will be done by applying the derivation processes above to the expression of Middle Data 1l=fm1l (Input Data 1l1, ... Input Data 1l1i, Middle Data 1l1l, ..., Middle Data 1l1j). So that, the data value attribute of each defined output data and each needed middle data can be derived using the processes above.

In the system operation concept above, the middle data are defined to store and share middle calculating results to support the output data calculations, so the values of said middle data are defined according to the calculations, and the timing attributes of said middle data are indirectly defined by said output data's transmission protocol, because said output data have the defined exporting times in their export transmission protocols, which must include said input data available time, said middle data available time, said calculation durations and said output data's exporting time durations, among those time attributes or time durations, all are defined by either their transmission protocols or their calculation durations except said middle data's timing attributes, so once said output data's timing attributes are defined by their transmission protocols, then said middle data's timing attributes can be derived from the known attributes or time durations of other data; the calculations are defined to transform and transport the input data and middle data to derive the output data.

Taking the system as a black box, the software output data which are the system output data as well represent the system external behaviors that are the expected system functionalities under the input data. From the system operation concept, the output data depend totally on the input data, the middle data and the calculations; and anything else that is not in the calculations will not have any effect to the output data.

The safety requirement analysis can be done based on the system operation concept. For example, if the Output Data 1 in the system operation concept above is a safety relevant data that will be related to a safety device, then the operations defined by the f1 and all the operated data in the f1 are safety relevant.

So, the development of the system safety and functionalities will be efficient and specific if said development focuses on only the elements that have effects to the output data. To define the timing attributes for each said output data, the maximum data value change frequency of said input data should be considered, so that the said output data's exporting frequency should not be more than said frequency; said output data's timing attributes should be derived from said output data's export frequency plus some system overheads time. And each said middle data in said calculation should be assigned a suitable time slot as said data's timing attributes according to said output data's timing attribute. Then each said middle data should be assigned to a suitable device in said computer system according said data's both attributes, that is: said assigned device's functional capacity and performance should meet said data's attributes. In this way, said software can be constructed according to said input, middle and output data's attributes.

From analysis above, in every computing system under development, it will be complete, specific and accurate that the development is to derive the two data attributes of each defined output data: data value and data timing based on the relevant input data and middle data. To make said input data ready, the development needs:

a. defining input transmission protocol for each said input data, wherein said protocol defines both systematic attributes of said input data; and
b. allocating a suitable input device and executing said inputting for each said input data, wherein said device meets said input transmission protocol;

wherein each said input data value is defined as value received from said input device; each said input data timing is defined as time when said data is imported from said input device and available to be used by said Arithmetic Logic Unit.

To make said middle data ready, the development needs:

a. constructing defined generation logic for each said middle data; and
b. constructing transmission protocol for each said middle data to transmit said middle data between said memory and said Arithmetic Logic Unit, wherein said protocol defines said data two systematic attributes; and
c. allocating a suitable memory device for each said middle data, wherein said device meets said middle data transmission protocol; and
d. executing said generation for each said middle data and storing said data into said memory device using said transmission protocol.

wherein each said middle data value is defined as generated value during said calculation stored in said memory device; each said middle data timing is defined as time duration reading from said memory device to be available to be used by said Arithmetic Logic Unit. To make said output data ready, the development needs:

a. constructing defined calculations for each said output data; and b. constructing exporting transmission protocol for each said output data, wherein timing attribute of said protocol is equal or more than said output data's calculated timing attribute; and c. transmitting all said input data in said calculation to said Arithmetic Logic Unit using said links by said management system; and d. transmitting all said middle data in said calculation to said Arithmetic Logic Unit using said middle data transmission protocol; and e. executing said constructed calculation for each said output data; and f. allocating a suitable output device for each said output data, wherein said device meets said output data exporting transmission protocol; and g. transmitting said output data from said Arithmetic Logic Unit to said output device using said links by said management system for each said output data; and h. exporting said output data from said output device for each said output data using said exporting transmission protocol.

wherein each said output data value is derived from said implemented calculation; each said output data timing is calculated as time summary of:

(1). time duration of making all said input and middle data in said output data's calculation to be available to be used by said Arithmetic Logic Unit in said calculation; plus (2). duration that is used by said Arithmetic Logic Unit to execute said calculation including transmission time that is used by said management system to transmit all said input and middle data in said output data's calculation from their locations to said Arithmetic Logic Unit using said links; plus (3). duration that said Arithmetic Logic Unit transmits said calculation result data as said output data to said output device; plus (4). duration that said output device exports said output data from said system.

The timing calculation above does not consider any interruption. In the reality, most computing systems must handle the interruptions, such as the interruptions from the high priority functions, waiting for responses from other functions, waiting for the input data from the input device functions.

In a computing system, there are two types of interruptions involved in the data timing calculations: the first one is waiting for needed data which are transferred from other functions to be ready; the second one is the interruptions from high priority functions.

Data timing attribute calculation considering interruptions is the sum of said data timing without considering interruption plus the interruption durations, in which, each interruption duration calculation is the same as a data timing calculation. So that, the data timing attributes of each required output data can be derived using the process above.

There are two part time durations in each data timing attribute calculation consisting of operation duration and transfer duration, in which, said operation duration is the time used by of said Arithmetic Logic Unit to do the operations defined in said calculation, for example, for said Output Data 1 in the system operation concept, the operation duration is the time used by the Arithmetic Logic Unit (ALU) to operate all the operated data in the formula defined in the f1; said transfer duration is the time to transfer said data from the source location to the destination location.

There are only two types of data transfer in a computing system consisting of synchronous data transfer and asynchronous data transfer.

Synchronous data transfer has the following types:

a. synchronous function call with parameters: the transferred data will be available immediately to the receiving function, so the duration is zero.

b. synchronous communication (either serial or parallel), the data available time that is the data transfer duration can be calculated based on clock information in the protocol.

Asynchronous data transfer has the following types:

a. Asynchronous function call: the duration should be calculated as the designed timeout value.

b. Asynchronous memory sharing, i.e., the contents availability in the shared memory must be known by periodic polling, whose duration is the designed timeout value.

c. Asynchronous communication: the duration is calculated based on the timing defined by the transmission protocol.

The benefits of using the disclosed embodiments to develop a computing system consist of making use the definitions from the system operation concept, and the whole development process above and the development measurement criteria are clearly and completely defined and optimized, the result of which will be efficient, accurate, complete and consistent.

The disclosed embodiments describe the safety development in a computing system consisting of the reliability development, availability development and quality control. The goal of safety development is to prevent the system and software from impacting the safety even if there is the presence of development mistake (human error) or non-foreseeable dynamic error, such as devices' defects, external interferences.

Reliability: it means that a software acts as implemented. Taking the famous "Hello World" software code as an example that is implemented to output the sentence of "Hello World", if the code can always output the sentence: "Hello World", then it can be said that the code is reliable because it does what is implemented. If there is a typo or mistake in the programming that wrote "World" as "Word", which results in that the software code will output: "Hello Word", and if the code can always output the sentence: "Hello Word", then it can still be said that the code is reliable because it does what is implemented, as well.

The developing reliability is defined as that both said data systematic attributes of each output data are matched between their implementations and their definitions, consisting of:

(1). detecting errors consisting only of data value error and data timing error, consisting of:

a). data value error detections, consisting of:

1). input data value errors detections consisting of checking each said input data implemented value from said input device against said input data transmission protocol; and 2). middle data value errors detections consisting of checking each said middle data implemented value from said memory devices against said middle data defined value; and 3). output data value errors detections consisting of checking each said output data implemented value against said output data defined value; and b). data timing errors detections, consisting of:
1). input data timing errors detections consisting of checking each said input data available time from said input device against said input data transmission protocol; and
2). middle data timing errors detections consisting of checking each said middle data available time from said memory device against defined middle data available time; and
3). output data timing errors detections consisting of checking each said output data implemented timing attribute against said output data defined time attribute; and
(2). errors reactions, consisting of:
a). stopping output of said output data if there is any error detected from said output data, or from middle data or input data that are used in said output data's calculation; and
b). informing said output data's users which are receivers of said output data outside said system about said detected errors; and
c). recording said detected errors and said errors causes consisting only of:
1) device defects;
2) interferences;
3) development mistakes; and
d). recovering from said errors if said errors do not exist anymore.

The detailed contents above are specified by ISO 26262, and the specific implementations will depend on the specific errors detected.

The system error detection is important for the reliability, which can be fully covered by two types of error detections: data value error detection and data timing error detection, which further can be fully covered by three types of data error detections: input data error detection, middle data error detection and output data error detection, in which the data are defined in the system operation concept.

Input data are input from outside of said computer using the input transmission protocol which includes the data timing checking and data integrity checking information, so the input data error detections can be done by the following:
a. Data Value Error detection: since the input data are from outside, so only the data transmission errors need to be detected, which can be done by checking the data integrity information, such as the CRC or checksum values that are embedded in the input data based on the input transmission protocol.
b. Data Tim Error detection: the timing of said input data is defined by the data transmission protocol, so the input data arriving time at the input port will be check by following the input transmission protocol to detect the timing errors.

Middle data and output data error detection:
a. Data Time Error: this type error cannot be detected exactly by the system under development, because all the data in a derivation and the instructions that operate said data in a computer will be processed by the Arithmetic Logic Unit (ALU) of said computer in serial, so they don't have the common time as a reference to detect the time error directly. However, the system under development can check each said middle data available time against the designed time and check each said output data derivation time against the designed time to make sure that said middle data available time and said output data derivation time meet the designed times using measures, such as timeout monitoring, internal or external watchdog, window watchdog, carefully designing the schedulers and task arrangements.
b. Data Value Error: this type error consists of data transmission error and data transforming error, wherein the data transmission error is detected and corrected by the computer's built-in mechanism, such as Error Correcting Code (ECC), so in most cases, the system under development does not need to detect said transmission errors, however, if the system needs to run the safety relevant software on the devices whose safety levels are lower than said software, then the system must ensure that said devices meet the safety requirements by explicitly running the data transmission error detection software routines. Data transforming error cannot be detected directly because the data should be changed by the operations defined in the calculation formulas in a computer, however, the system under development can check each said middle data value against the designed value; and check each said output data derivation value against the result plausibility using measures such as result value range checks, comparing the result values with the experience model values, comparing the result values with the simulation values, comparing the result values with the redundant storage values or redundant calculation result values.

Availability Development

Availability: the availability is a software's ability to provide the required functionalities even when something goes wrong in the system, which requires that the software should have the redundant mechanism for certain important functionalities. For example, to detect the objects on the road, the autonomous driving vehicle will have at least two redundant mechanisms for such object detection, one uses the radar, another uses the camera, and they are independent each other, so that the object detection ability is increased in cases where either the radar or the camera is out of order.

Another example is the braking system in a vehicle, which consists of two sub-systems: the Electronic Control Braking System (ECBS) that is the main brake system and the Electronic Parking Braking System (EPBS) that is the backup brake system, i.e., in the case where the main braking system: Electronic Control Braking System (ECBS) goes wrong, then the Electronic Parking Braking System (EPBS) can be used to decelerate the vehicle.

The availability can be enhanced by the recovery from the fault states, which requires that the software should recover from the faults in the manner that the system functionality is still acceptable while the safety is not impacted, though it will not meet the system functional availability requirements in some cases, especially in the real time systems.

Quality Control

Quality control: the goals of quality control in the development are to make sure that the development designs what are required and implements what are designed. In another words, quality control is to prevent the development from deviations between what are implemented and what are required that are caused by any failure cause and especially development mistakes, which can be done from both the technical aspect and the management aspect consisting of:
(1). verifying if said definitions of said input data and said output data meet said system's requirements; and
(2). verifying if said constructions of both systematic attributes of all said output data satisfy said output data's definitions which are derived from said system's requirements; and (3). verifying if executions of both systematic attributes of all said output data meet said output data calculation definitions.

How to develop the accurate and qualified required software is the technical aspect, such as executing the system integration test, system black box verification. How to avoid making mistakes in the development is the management aspect, for which the organizations need to set up the development processes, such as ASPICE, ISO/TS 16949.

From the technical aspect, the method to ensure the development quality is to do the verifications or tests, and methods to test said software consist of:
 a. to run the product if it is a piece of software source code or hardware component, or
 b. to simulate the software if it is a design concept, or
 c. to review the product if it is a document, or
 d. to plan the activities and review the execution if it is a development procedure.

From the management aspect, the quality control is to have the qualified development process in place, which demonstrates that the organizations have the established procedures to develop the safety software, which should include:
 a. The established development processes, such as ASPICE, to direct the software developments, or re-use the existed software and technology for the development.
 b. The established development processes are compliant with the industrial standards, such as ISO/TS 16949, ISO 26262, UN ECE 155/156.

The benefits of disclosed embodiments for the safety development in a computing system are:
 a. Full system error detection: provide the solution to fully detect the errors in the system under development, which consist of only two types of errors: data value error and data timing error.
 b. Approach to achieve the safety: provide the defined solution to achieve the three aspects that are needed by the safety in the system under development, which will reuse the system operation concept and will mainly focus on the data in the system operation concept, so the development will be efficient, and the result will be accurate and consistent.

I claim:

1. A method of constructing a computing system software on a computer system, wherein said method consisting of:
 defining and implementing a plurality of data based on said system's requirements, wherein each said data consists of only two systematic attributes consisting of data value attribute and data timing attribute, consisting only of three types of data:
 one or more input data which are imported from input devices of said system; and
 one or more middle data which are stored in memory devices of said system; and
 one or more output data which are exported by output devices of said system; and
 defining and implementing data calculations for each said output data using one or more said middle data and one or more said input data in said system, wherein each said calculation consists of:
 one or more mathematic expressions; or
 one or more logic expressions; or
 one or more experience expressions; or
 one or more artificial intelligence expressions; or
 derivations of one or more said expressions above; and executing said implemented calculations to derive both said systematic attributes for each said output data which are development goals of said system software; and
 developing safety mechanisms for each said output data to prevent said system software from outputting deviated data if either attribute of said data deviates from their definitions;
 wherein developing safety mechanisms for each said output data consists of:
 developing reliability defined as that both said data systematic attributes of each output data are matched between their implementations and their definitions, consisting of:
 detecting errors consisting only of data value error and data timing error, consisting of: data value error detections, consisting of:
 input data value errors detections consisting of checking each said input data implemented value from said input device against said input data transmission protocol; and
 middle data value errors detections consisting of checking each said middle data implemented value from said memory devices against said middle data defined value; and
 output data value errors detections consisting of checking each said output data implemented value against said output data defined value; and
 data timing errors detections, consisting of: input data timing errors detections consisting of checking each said input data available time from said input device against said input data transmission protocol; and
 middle data timing errors detections consisting of checking each said middle data available time from said memory device against defined middle data available time; and
 output data timing errors detections consisting of checking each said output data implemented said timing attribute against said output data defined time attribute; and
 errors reactions, consisting of:
 stopping output of said output data if there is any error detected from said output data, or from middle data or input data that are used in said output data's calculation; and
 informing said output data's users which are receivers of said output data outside said system about said detected errors; and
 recording said detected errors and said errors causes consisting only of:
 device defects;
 interferences;
 development mistakes; and
 recovering from said errors if said errors do not exist anymore; and developing availability defined as that neither said output data systematic attributes will be impacted even if there is any error in said data calculations, consisting of developing independent redundant said data calculations; and managing quality of each said output data, consisting of:
 verifying if said definitions of said input data and said output data meet said system's requirements; and
 verifying if said constructions of both systematic attributes of all said output data satisfy said output data's definitions which are derived from said system's requirements; and
 verifying if executions of both systematic attributes of all said output data meet said output data calculation definitions;

wherein said computer system consisting of:
one or more input devices for inputting said input data into said computer system from outside using input transmission protocol; and
one or more output devices for outputting said output data out of said computer system from inside using output transmission protocol; and
one or more memory devices for storing said middle data that are generated during said calculations; and
one or more Arithmetic Logic Unit devices for doing said calculations; and
one or more data transmission links between said devices; and
a management system for managing said devices and said links.

2. The method of claim 1,
wherein each said input data value is defined as value received from said input device; each said input data timing is defined as time when said data is imported from said input device and available to be used by said Arithmetic Logic Unit;
wherein each said middle data value is defined as generated value during said calculation stored in said memory device;
each said middle data timing is defined as time duration reading from said memory device to be available to be used by said Arithmetic Logic Unit;
wherein each said output data value is derived from said implemented calculation;
each said output data timing is calculated as time summary of:
time duration of making all said input and middle data in said output data's calculation to be available to be used by said Arithmetic Logic Unit in said calculation; plus
duration that is used by said Arithmetic Logic Unit to execute said calculation including transmission time that is used by said management system to transmit all said input and middle data in said output data's calculation from their locations to said Arithmetic Logic Unit using said links; plus
duration that said Arithmetic Logic Unit transmits said calculation result data as said output data to said output device; plus
duration that said output device exports said output data from said system.

3. The method of claim 1, wherein implementing said input data consists of:
defining input transmission protocol for each said input data, wherein said protocol defines both systematic attributes of said input data; and
allocating a suitable input device and executing said inputting for each said input data, wherein said device meets said input transmission protocol;
wherein implementing said middle data consists of:
constructing defined generation logic for each said middle data; and
constructing transmission protocol for each said middle data to transmit said middle data between said memory and said Arithmetic Logic Unit, wherein said protocol defines said data two systematic attributes; and
allocating a suitable memory device for each said middle data, wherein said device meets said middle data transmission protocol; and
executing said generation for each said middle data and storing said data into said memory device using said transmission protocol;
wherein implementing said output data and executing said implemented calculations consists of:
constructing defined calculations for each said output data; and
constructing exporting transmission protocol for each said output data, wherein said timing attribute of said protocol is equal or more than said output data's calculated timing attribute; and
transmitting all said input data in said calculation to said Arithmetic Logic Unit using said links by said management system; and
transmitting all said middle data in said calculation to said Arithmetic Logic Unit using said middle data transmission protocol; and
executing said constructed calculation for each said output data; and
allocating a suitable output device for each said output data, wherein said device meets said output data exporting transmission protocol; and
transmitting said output data from said Arithmetic Logic Unit to said output device using said links by said management system for each said output data; and
exporting said output data from said output device for each said output data using said exporting transmission protocol.

* * * * *